United States Patent [19]
Robertson et al.

[11] 3,883,364
[45] May 13, 1975

[54] ALKALINE EARTH CARBONATES

[75] Inventors: James A. Robertson, Levittown, Pa.;
David W. Tunison; Andrew O. C. Fong, both of Modesto, Calif.

[73] Assignee: FMC Corporation, New York, N.Y.

[22] Filed: Jan. 4, 1974

[21] Appl. No.: 430,766

Related U.S. Application Data

[62] Division of Ser. No. 286,478, Sept. 5, 1972, Pat. No. 3,802,901.

[52] U.S. Cl. ............. 106/306; 106/63; 106/288 B; 106/DIG. 8
[51] Int. Cl. ............................................. C09c 1/02
[58] Field of Search .......... 106/DIG. 8, 84, 63, 306, 106/308 B

[56] References Cited
UNITED STATES PATENTS

| | | | |
|---|---|---|---|
| 2,540,182 | 2/1951 | Albert | 106/308 B |
| 2,865,781 | 12/1958 | Wainer | 106/306 |
| 3,133,824 | 5/1964 | Podschus | 106/306 |
| 3,615,811 | 10/1971 | Barrett | 106/306 |

*Primary Examiner*—J. Poer
*Attorney, Agent, or Firm*—Thomas B. Graham

[57] ABSTRACT

A dust-free granular alkaline earth carbonate material particularly suited for feed stock for glass furnaces and the process for preparing said granular material, wherein the alkaline earth carbonate in freshly prepared aqueous slurry in finely divided form is combined with a solution of alkali silicate sufficient to provide on the basis of solid to solid, about 0.25%, by weight, of silicon dioxide and the slurry is dried and sintered by heating and holding it at a temperature of about 700°–900°C for about one-half hour, thereby converting the solids in the aqueous slurry to a dense material which can be ground to a dust-free, free flowing form giving a high yield of 16 to 140 mesh size suitable for use as a feed stock in glass furnaces.

5 Claims, No Drawings

ALKALINE EARTH CARBONATES

RELATED APPLICATIONS

This application is a division of copending application Ser. No. 286,478 filed Sept. 5, 1972, which has since issued as U.S. Pat. No. 3,802,901, Apr. 9, 1974, and assigned to the assignee of the instant application.

BACKGROUND OF THE INVENTION:

Glass grade alkaline earth carbonates often show objectionable breakdown physically during storage and transport to form fines, which fines in subsequent handling generate serious dusting problems and may be blown from the glass furnace, thus requiring more material to be charged to the furnace in order to reach a set final concentration in the glass. Such granular alkaline earth carbonates have a tendency to deagglomerate, or come apart, particularly in a humid atmosphere, or to physically degrade to form dust. This problem possibly is a characteristic of the alkaline earth carbonate as commercially produced inasmuch as the product will have a sodium content as high as two tenths to four tenths percent in the composition, probably as a sodium carbonate.

The use of soluble alkali silicates as binders for alkaline earth carbonates is not new. Vail in his treatise on soluble silicates (Vol. II, p. 446), tells of the use of sodium silicate and limestone mixtures for road building prior to 1930. Sodium silicate has also been used both to provide a green bond and to assist in the development of a sintered bond on firing of the "magnesite" (MgO) refractories. There are other references to bonding of limestone or limestone-containing mixes with soluble silicates. Apparently their conversion to insoluble alkaline earth silicates provides the bonding mechanism. This could be true in both aqueous and melt systems.

The use of sodium silicate as a film-forming binder to consolidate and strengthen barium carbonate as dried agglomerate is covered in U.S. Pat. No. 3,615,811, issued to Barrett of Chemical Products Corp., Oct. 26, 1971. This process deals with dried slurries of alkaline earth carbonates containing sodium silicate which have not been sintered. The suggested silicate binders function as a glue when dried but on rewetting the material comes apart to form a dispersable phase having a viscosity of about 50–75 C.P.S. at 75% solids.

The basic objective of the invention is to provide a means for preparing such alkaline earth carbonates as strontium and barium in a granulated form suitable for glass use so that they will hold that form without physical degradation to objectionable dust in the presence of moisture such as is commonly encountered in humid atmospheres.

DETAILED DESCRIPTION OF THE INVENTION

We have found that by the addition of small amounts of soluble alkali metal silicates, e.g. sodium silicate or potassium silicate, to the aqueous slurry of the alkaline earth carbonate which is fed to the dryer and, thereafter, by mixing, drying and sintering the material at about 800°C (700°–900°C) for one-half hour to 1 hour, the tendency of the alkaline earth carbonate to break down is overcome. The phenomenon is probably attributable to the formation of a water insoluble alkaline earth silicate bond as a bridge between crystals of the alkaline earth carbonates. The granular materials coming out of the sintering process thus are tougher, stronger aggregates than are usually encountered with alkaline earth carbonates and on milling tend to develop appropriate mesh size to give more grain and less fine dust than conventionally prepared carbonates. These are the direct benefits and the direct and immediate characteristics of the process carried out in accordance with the invention.

Thus, the process consists of preparing the alkaline earth metal carbonate slurry by whatever precipitation technique is used, washing it to the pure form so that any sodium carbonate content, or sodium content, is reduced virtually to the unwashable minimum, the slurry being reduced to a moisture content of about 35%, which is a convenient level for handling, and using this slurry as a feed to the sintering dryer; injecting into the slurry with mixing as it is passed to the dryer a sodium silicate solution of commercial concentration (3.22 ratio of $SiO_2$ to $Na_2O$ 41° Be) in an amount sufficient to provide about 0.05 to about 0.50% $SiO_2$, calculated as such on the basis of the dry alkaline earth carbonate in the slurry. We relate the amount of silicate on the dry basis to the dry amount of the alkaline earth carbonate because the water content of the slurry which approaches the silicate addition stage is whatever suits the convenience of the operator in handling. The important element is to add about the right amount of silicate to achieve in the dryer the appropriate ratio of alkali metal silicate to alkaline earth carbonate which is important in achieving the end results.

To compare the prior art product with ours, an aqueous slurry of strontium carbonate was treated by the addition of a small amount of silicate and the slurry dried, as practiced in the prior art. The sodium silicate addition, as such, resulted in a slight strength improvement in the dried product. The strength was substantially improved when the particles were sintered to about 800°C in accordance with the instant process. This also rendered them bone dry and a reduced amount of dusting was noted. The placement of this sintered product in water induced no breakdown of particles at all.

In another sequence of qualitative observations, a slurry of sodium silicate-free strontium carbonate, at 35% moisture, was used for spray drying purposes. It was noted that upon heating this spray dried material for a period of about 5 minutes at 900°C the crystals grew from an original size of about 1 micron to about 6 microns. The enlarged crystallites slowly came apart when placed in water. A second comparative qualitative test was made with a small amount of sodium silicate solution added to the slurry. When this material was dried to aggregates and these heated to 700°C a significant shrinkage of the aggregates was observed. The pieces became tough and hard and on heating to 900°C the crystallite again grew in sizes in the 3–10 micron range but after this treatment, they would not come apart in water.

A sample of strontium carbonate filter cake was treated with $Na_2SiO$, solution to form a slurry. It was dried at 120°C overnight and then heated to 650°C, without sintering, for one-half hour. After cooling, the product was brittle but weak and showed 1 micron crystallites. After sintering at 800°C for one-half hour the lumps had shrunken to a dense, hard, grey-colored mass. They were tough and difficult to mill. After crushing all the product to −20 mesh, it showed 56%

−20 +40 mesh and only 16% −100 mesh, indicating a tough, hard material. The crystallites were well developed at 5 micron average size and did not come apart in water. The −40 mesh fraction was analyzed for silica. It analyzed 0.24% $SiO_2$, equivalent to 0.49% $Na_2SiO_2$.

A hopper car of $BaCO_3$ was loaded and kept on a siding during a rainy period for two months at which time it was carefully sampled and the $BaCO_3$ particles were found to have undergone a significant physical breakdown. This demonstrated that the problem exists with $BaCO_3$ as well as with $SrCO_3$. The $BaCO_3$ does not degrade after being sintered with sodium silicate in accordance with the present invention.

Thus, based on laboratory observation and actual pilot scale operation, the process can be defined in terms of the steps of adding specified amounts of silicate, passing the thus treated slurry or filter cake to a drying-sintering step where it is sintered at a temperature of 700°–900°C, sufficient to render it completely bone dry, and actually to induce a certain degree of fusion of the silicate and, thereafter, recovering the thus treated alkaline earth metal carbonate and reducing it to the appropriate particle size for use in glass.

We have found that in addition to improving the stability of the alkaline earth metal carbonate, the subsequent milling to reduce the product to the appropriate particle size gives a considerably reduced generation of fines and a better flowability of the product as well as an improved (high) bulk density of the product.

While it is not quite clear precisely what occurs in the sintering step in the presence of the silicate, an improved end product does result. It may involve some phase changes that modify interfaces among particles as well as the formation of oxide. In the previous practice, the precursors of the products contain small amounts of soluble phases when they are first formed, which water soluble phases, principally sodium carbonate, are not easily washed out prior to drying and these tend to accummulate in the crystalline boundaries during sintering to block intercrystalline bonding and to substitute the soluble phase bond. When this material is moistened the bond dissolves and allows the crystallites to come apart. It appears that the addition of small amounts of the soluble silicates followed by the sintering at about 700°–900°C overcomes this tendency to break down, probably through the formation of insoluble alkaline earth silicate bonds as bridges between the crystals. The tough strong aggregate which is thus produced when subjected to milling yields more of the grain and considerably less of the fine dust.

Other polyanions which form water soluble glass-like materials with sodium, such as phosphates, aluminates and borates, etc., may be useful as sintering agents in addition to or in place of sodium silicate. The amount to be added to the alkaline earth metal carbonate is about 1/2%.

The reasons for the structural differences observed in our product with the prior art products can be understood by analogy with other systems, e.g., MgO, $Na_2CO_3$, etc. Most crystalline materials tend to sinter with recrystallization at temperatures about 0.6 of their absolute melting points. If melt-forming impurities, e.g., $Na_2CO_3$, are present, the sintering temperatures are lowered. If we assume 1,500°C as a melting point for $SrCO_3$, then 800°C heating should bring about sintering in the pure solid — provided the particle size is in the "active" region, i.e., 1 micron or less. If the particle size is 2 microns or greater, the body does not sinter to a dense mass, but to a high porosity structure with limited contact between grains. When the particle size is below 1 micron, the sintered body recrystallizes to give large, densely packed grains which are directly bonded to each other and in contact with other grains at essentially all surfaces. Aggregates of such grains are almost as strong as single grains and require lattice-disrupting forces to separate them.

If melt-forming impurities are present, not only is the sintering temperature lowered, but the sintering mechanism is changed. These impurities, at high temperatures, tend to collect in the crystal interstices and to dissolve the crystal surfaces. This causes the crystals to become rounded, the smaller crystals to disappear and the remaining larger crystals to become isolated from each other. Depending upon the time-temperature history of the sample and upon the solvent power and quantity of matrix, the grains may vary from widely isolated spheres to closely packed polygons. However, if the matrix is preferentially dissolved away, the grains will be freed and left behind as loose sand. If the matrix is water-soluble and the grain water-insoluble, this behavior can be observed when the product is moistened with water.

In previous practice, glass grade strontium carbonate, containing no sodium silicate, consisted of aggregates of separate grains of $SrCO_3$. These grains were completely surrounded by and bonded to each other with a layer of water-soluble matrix which was mainly $Na_2CO_3$. When moistened, the grains came apart. These grains were about 10 microns in diameter and hence, would behave as dust under gas flows which would not carry off the coarse aggregates (250 microns) desired as furnace feed. Any wet batching, high humidity storage or accidental moistening of the feed during the time between plant drying and glass furnace fusion, could lead to generation of excessive dusting. The operation of this breakdown mechanism can be verified by examination of the fines which have developed on storage. If these fines consist of separated grains of the same size and shape as those of the product, then they probably formed by this mechanism.

Strontium carbonate filter cake or slurries for which improvement is sought are made up of flocculated clusters of 0.5 to 2.0 micron particles. When one tries to sinter this product, a melt phase develops at about 600°C which completely wets the particle surfaces, causing the solid to shrink and turn grey. The melt becomes the continuous phase and the crystals become the discontinuous phase. Continued heating causes the crystal to grow, with the simultaneous consolidation and concentration of the melt phases between the crystals. The $Na_2CO_3$-rich melt is a good solvent for $SrCO_3$ and tends to dissolve any peninsulas or isthmuses which existed, thereby destroying any crystal-crystal bridges and completely isolating the grains of solid phase. As the isolation becomes greater through crystal growth and surface dissolution, the aggregate is more readily susceptible to breakdown by bond dissolution in water. Hence, strontium carbonates which have been heated to higher temperatures become more readily susceptible to such breakdown. This same structure can be developed in reagent grade $SrCO_3$ by addition of $Na_2CO_3$ followed by sintering at tmperatures between 600°C and 900°C.

Manufacturer's excess $Na_2CO_3$ in commercial strontium carbonate undoubtedly comes from precipitation with a slight excess $Na_2CO_3$ to obtain maximum recovery of strontium values. This procedure would not be objectionable if the excess $Na^+$ could be washed out of the filter cake. Apparently, it cannot be washed out with water alone but leaves a material subject to soluble bond formation on sintering.

Our remedy is the addition of a bonding medium which forms a water insoluble bond between crystals, i.e., a soluble silicate. Soluble phosphates or aluminates might serve this purpose, but the silicate is the most compatible with a glass batch. Here the silicate, added as soluble material, forms an insoluble bridge probably by attaching to $Sr^{++}$ at the solid surface.

The following specific examples will indicate the conditions for actual practice of the invention.

EXAMPLE 1

In a plant scale operation, a filter cake of aqueous barium carbonate, containing 60–65% solids, was fed to a rotary kiln by means of a feed screw. A near saturated aqueous solution of sodium silicate ($SiO_2:Na_2O$ weight ratio of 3.22:1) was mixed with the barium carbonate filter cake being fed to the feed screw. Sufficient sodium silicate was added to obtain a barium carbonate product containing the silicate in amounts of from 0.17 to 4.42% expressed as weight percent $SiO_2$ based on the weight of the barium carbonate. The mixture of sodium silicate and barium carbonate filter cake was conveyed into the feed end of the rotary kiln. The kiln was heated by directly fired gas entering the discharge end of the kiln. With this source of heat the kiln was maintained at a temperature sufficient to heat the feed to 780°C. In practice, as the feed moved progressively through the kiln countercurrent to the flow of hot gases, it was first progressively dried, as it moved towards the discharge end (fired gas end) of the kiln it was maintained at 780°C for a time sufficient to effect sintering of the product before it was discharged from the kiln. The product was screened to remove a +16 mesh fraction and this fraction was milled to −16 +140 mesh size. The milled fraction and the unmilled −16 fraction were combined to constitute the final product. The packed bulk density of the product without added silicate was 141 lb/ft³; the product with added silicate had a density of 167 lb/ft³. The run was continued for 24 hours and the resulting product had the following properties.

TABLE I

| Sample Time | Percent Silicate (as $SiO_2$) | Dry Screen %-100 | %-140 |
|---|---|---|---|
| 0757 | none added | 23.8 | 19.7 |
| 2052 | 0.18 | 13.3 | 9.3 |
| 0116 | 0.18 | 11.5 | 7.7 |
| 0222 | 0.21 | 11.1 | 7.8 |
| 0418 | 0.31 | 4.6 | 0.9 |
| 0517 | 0.38 | 10.3 | 6.5 |
| 0615 | 0.42 | 11.9 | 8.1 |
| 0920 | 0.25 | 11.8 | 7.9 |
| 1100 | 0.17 | 10.9 | 7.2 |

Other test results obtained are:

1. Water degradation observations

When placed in water under a microscope, a sample of the ground product (containing 0.17% silicate expressed as $SiO_2$) showed no breakdown; material without silicate readily broke down.

2. Wet degradation and screening tests

A fixed size sample of −16 +18 mesh was placed in water in an Erlenmeyer flask and shaken for half an hour after which the contents were placed on a 140 mesh screen. Material solids (−140 mesh) passing through the screen were collected in a gooch filter and weighed to give the percent broken down (% degradation).

The results are as follows:

| Barium carbonate | % degradation |
|---|---|
| without silicate | 84.3–87.4 |
| with silicate (0.17% $SiO_2$) | 0.9 |
| with silicate (0.42% $SiO_2$) | 0.5 |

3. Frangibility test

In the frangibility test 100 grams of material, screened to −16 +40 mesh, were Rotapped over a 100 mesh screen with three 1⅜ inch diameter pure gum rubber balls for 15 minutes. Percentage of material passing through the screen was expressed as percent frangibility.

| Barium carbonate | % frangibility |
|---|---|
| without silicate | 2.6–3.4 |
| with silicate (0.17% $SiO_2$) | 0.8–0.9 |
| with silicate (0.42% $SiO_2$) | 0.8–0.9 |

4. Product hardness

The increase in product hardness was determined as a function of the work index required to grind the product. The work index is a measure, expressed in Kwh/ton, of the work needed to grind a ton of product to a given specified size.

| Barium carbonate | work index |
|---|---|
| no silicate | 2.99 |
| with silicate (0.18% $SiO_2$) | 13.10 |
| with silicate (0.31% $SiO_2$) | 13.43 |

5. Particle density

The density of a sample of the product was determined by mercury displacement at esssentially atmospheric pressure.

| Barium carbonate | Density g/cc |
|---|---|
| no silicate | 3.55 |
| with silicate (0.25% $SiO_2$) | 3.64 |

EXAMPLE 2

Another plant scale operation was carried out using the same equipment and technique as set forth in Example 1; however, in this case the run was carried out for two days and the feed was a filter cake of aqueous strontium carbonate rather than the barium carbonate specified in Example 1. In addition, the amount of sodium silicate added was sufficient to obtain a product containing the silicate in amounts of from 0.10 to about 0.17%, expressed as weight percent $SiO_2$ based on the weight of the strontium carbonate. During the run, the level of silicate was reduced to as low as 0.06% (expressed as weight percent $SiO_2$) to determine the effect of these low silicate contents on the product. After milling out and screening the product as set forth in Example 1, the strontium carbonate product was found to have a bulk density of 165 lb/ft³ and the following properties.

TABLE II

| Sample Time | Percent Silicate (as $SiO_2$) | Dry Screen %-100 | %-140 |
|---|---|---|---|
| 1100 | none added | 20.3 | 16.9 |
| 1450 | 0.06 | 18.8 | 14.0 |
| 1800 | 0.20 | 7.7 | 4.6 |
| 1900 | 0.19 | 8.6 | 5.2 |
| 2000 | 0.20 | 8.2 | 4.8 |
| 2400 | 0.19 | 9.5 | 5.7 |
| 0200 | 0.16 | 8.5 | 5.0 |
| 0600 | 0.17 | 9.0 | 5.8 |
| 1100 | 0.15 | 8.5 | 5.3 |
| 1400 | 0.17 | — | — |
| 1800 | 0.15 | 10.6 | 7.3 |
| 2200 | 0.16 | 13.1 | 8.5 |
| 0200 | 0.17 | 9.7 | 5.8 |
| 0500 | — | 9.1 | 5.6 |
| 0600 | 0.17 | 8.1 | 5.7 |
| 0800 | — | 8.5 | 4.9 |
| 1300 | — | — | — |
| 1440 | 0.10 | 14.6 | 10.6 |

Other test results are as follows:

1. Water degradation observations

When placed in water under a microscope a sample of the ground silicate-containing product showed no breakdown; material without silicate readily broke down.

2. Wet degradation and screening tests

| Strontium carbonate | % degradation |
|---|---|
| without silicate | 84.4 |
| with silicate (0.19% $SiO_2$) | 0.8 |
| with silicate (0.059% $SiO_2$) | 5.7–21.6 |

3. Frangibility test

| Strontium carbonate | % frangibility |
|---|---|
| without silicate | 4.9–8.0 |
| with silicate (0.17% $SiO_2$) | 0.36 |

4. Product hardness

| Strontium carbonate | work index |
|---|---|
| no silicate | 3.04 |
| with silicate (0.17% $SiO_2$) | 11.50 |

5. Particle density

| Strontium carbonate | Density g/cc |
|---|---|
| no silicate | 3.30 |
| with silicate (0.17% $SiO_2$) | 3.70 |

EXAMPLE 3

The procedure of Example 2 was repeated to yield a product varying from 0.01 to 0.19% by weight of silicate (expressed as weight percent $SiO_2$ based on the weight of the strontium carbonate). A wet degradation and screening test (described in Example 1) was used to evaluate the product's tendency to break down with the following results.

| Percent $SiO_2$ | Percent Degradation |
|---|---|
| 0.01 | 86.5 |
| 0.06 | 13.6 |
| 0.08 | 10.9 |
| 0.10 | 3.9 |
| 0.14 | 2.5 |
| 0.19 | 0.76 |

The 0.01% $SiO_2$ represents background $SiO_2$ levels from impurities in the strontium carbonate product. The results above show the striking change in resistance to degradation upon addition of as little as 0.05% silicate (expressed as $SiO_2$) to the strontium carbonate product. Best results appear to be obtained at the higher silicate levels, e.g., 0.14% (expressed as $SiO_2$) and above.

The silica is added as silicate and undoubtedly remains as silicate at all times although it may change from soluble alkali silicate to insoluble alkaline earth silicate. Since the exact nature of the silicate is difficult to define, its percentage content is expressed in conventional terms as % $SiO_2$ recognizing that silica or $SiO_2$ per se probably does not exist at any stage in the product.

Upper limits of silicate addition probably depend more on economic than technical reasons since the user prefers a high assay, undiluted product. Apparently 0.14% $SiO_2$ is enough, for best results. A limit of about 0.50% $SiO_2$ should be adequate even with imperfect mixing.

There are technical reasons for limiting the maximum sintering temperature since phase transitions and some decomposition (in the presence of impurities) apparently occur in the 850°–950°C range. The lower sintering temperature limit (about 700°C) is dictated by impurity levels (including $SiO_2$ addition level) which controls sintered bond formation. (These temperature limits should not be regarded as restrictive since varying impurity levels might well allow development of a strong water insoluble bond outside the 700°–900°C range.)

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. A dust free granular alkaline earth metal carbonate selected from the group consisting of barium and strontium carbonates, in physical form, suitable for feed stock in glass furnaces, the product being characterized by its graininess and particle hardness and capacity to be handled mechanically without generating fine dust, said product including as an intercrystalline sintering agent, dispersed through it an alkali metal silicate in an amount providing from 0.05 to 0.50 percent by weight of silicate (expressed as silicon dioxide) which is sintered into the total final composition.

2. The product in accordance with claim 1 in which the material is strontium carbonate with about 0.14 percent of $SiO_2$.

3. The product in accordance with claim 1 in which the material is barium carbonate with about 0.17 percent of $SiO_2$.

4. The product in accordance with claim 1 in which the material is strontium carbonate with about 0.14–0.50 percent of $SiO_2$.

5. The product in accordance with claim 1 in which the alkali metal silicate is sodium silicate.

* * * * *